United States Patent [19]
Haraguchi

[11] Patent Number: 5,150,420
[45] Date of Patent: Sep. 22, 1992

[54] SIGNATURE IDENTIFICATION SYSTEM

[75] Inventor: Kaoru Haraguchi, Kyoto, Japan

[73] Assignee: Omron Tateisi Electronics Co., Kyoto, Japan

[21] Appl. No.: 715,742

[22] Filed: Jun. 18, 1991

Related U.S. Application Data

[63] Continuation of Ser. No. 921,146, Oct. 21, 1986, abandoned.

[30] Foreign Application Priority Data

Oct. 21, 1985 [JP] Japan .................. 60-235976

[51] Int. Cl.[5] .............................. G06K 9/00
[52] U.S. Cl. ........................ 382/3; 235/380; 340/825.34; 382/13
[58] Field of Search ............... 382/3, 13; 235/380; 178/18-20; 340/825.34

[56] References Cited

U.S. PATENT DOCUMENTS

| | | | |
|---|---|---|---|
| 3,579,186 | 5/1971 | Johnson et al. | 282/3 |
| 3,889,056 | 6/1975 | Mayer | 356/71 |
| 3,955,178 | 5/1976 | Warfel | 382/3 |
| 4,020,463 | 4/1977 | Himmel | 382/3 |
| 4,344,135 | 8/1982 | Crane | 382/3 |
| 4,385,285 | 5/1983 | Horst | 382/3 |
| 4,506,148 | 3/1985 | Berthold | 235/380 |
| 4,550,248 | 10/1985 | Hoppe | 235/492 |
| 4,614,861 | 9/1986 | Pavlov et al. | 235/380 |
| 4,680,801 | 7/1987 | Etherington | 382/3 |
| 4,718,103 | 1/1988 | Shojima et al. | 382/3 |
| 4,752,965 | 6/1988 | Dunkley et al. | 382/3 |

OTHER PUBLICATIONS

"Identification Technologies" by Warfel, Published by Charles C. Thomas, 1979 pp. 108-109.

Primary Examiner—Joseph Mancuso
Attorney, Agent, or Firm—Dickstein, Shaprio & Morin

[57] ABSTRACT

A signature identification system includes an IC card having a memory storing sign data representing a genuine signature and a display device for displaying the genuine signature by readign the sign data stored in the IC card. A writing unit includes a sign reading device for reading a genuine signature signed by an authorized person and a writing device for writing data representing the read genuine signature on an IC card, whereby the genuine signature is invisibly stored in the IC card and imitation of the genuine signature by viewing the genuine signature in the card can be avoided.

3 Claims, 5 Drawing Sheets

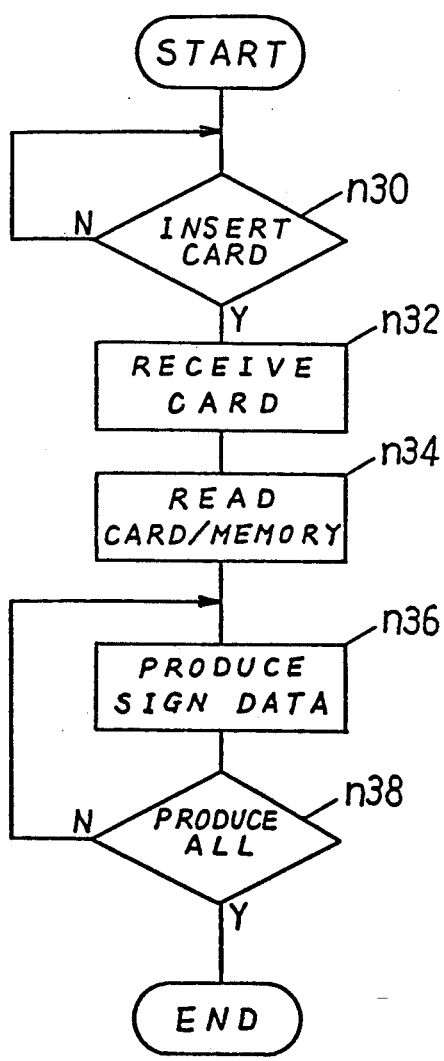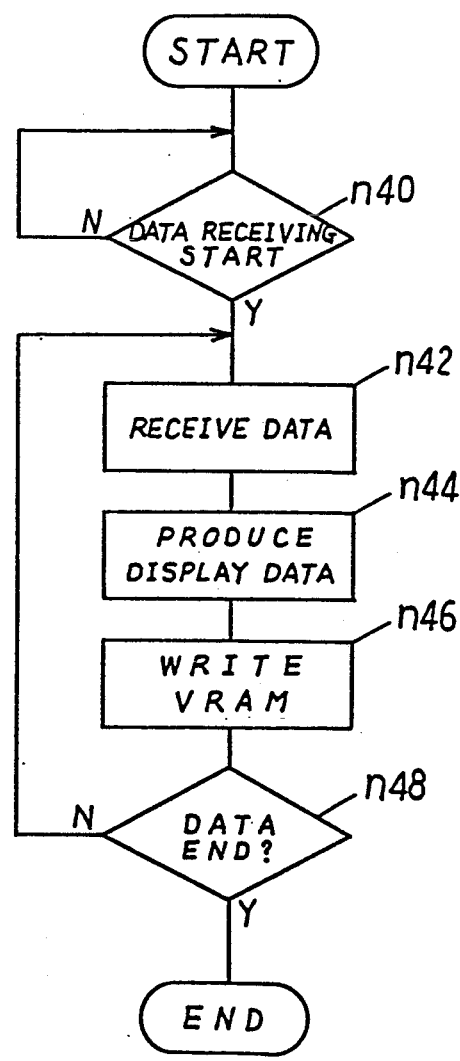

SIGNATURE IDENTIFICATION SYSTEM

This application is a continuation of application Ser. No. 06/921,146, filed Oct. 21, 1986 now abandoned.

BRIEF SUMMARY OF THE INVENTION

This invention relates to a signature identification system which may be used for identifying whether a card holder is an authorized person by checking his or her signature, and more particularly to an improved system by which such identification may be safely and precisely performed. Conventionally, in order to identify if a credit card holder is authorized to use a credit card, a clerk or cashier compares the signature signed on a check or contract with the genuine signature signed on the credit card presented to him or her.

Such a credit card written with the genuine signature, however, incurs the risk of being abused. If the card is stolen, the person holding the stolen card may learn the genuine signature signed on the card and be able to forge the signature. Moreover, the space on the card for signature is so small that the signature must be small and its accurate comparison with the signature on the check is therefore difficult.

In accordance with this invention, there is provided a signature identification system comprising a memory card adapted to store invisible sign data representing a genuine signature therein, reading means for reading out the sign data in the memory card, and display means for displaying the genuine signature based on the read out sign data so that the genuine signature displayed on the display means can be visually compared with another signature signed on another document to identify if the other signature is genuine.

Therefore, it is a primary object of this invention to provide a signature identification system in which a genuine signature concealed within a card can be easily compared with the signature signed by the card holder for his or her authorized use.

It is a further object of this invention to provide a signature identification system including a storage card having a memory storing data representing the genuine signature so that the signature stored in the storage card is invisible to the naked eye.

It is a still further object of this invention to provide a signature identification system including a display device to display the genuine signature stored in a storage card.

These and other objects will become apparent from a reading of the following specification and claims in connection with the drawings in which:

BRIEF DESCRIPTION OF DRAWINGS

FIG. 7A is a flow chart illustrating the operation for reading a card in the display device; and FIG. 7B is a flow chart illustrating the operation by a controller in the display device.

DETAILED DESCRIPTION

Figure 1:
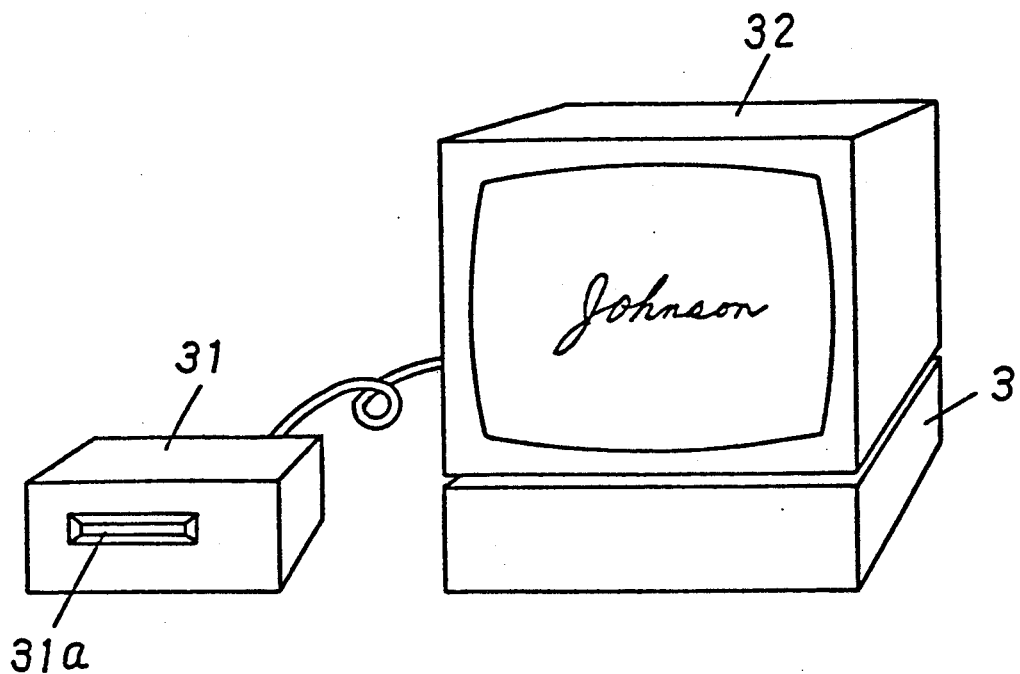
FIG. 1 is a schematic external view illustrating a display device of a signature identification system in accordance with a preferred embodiment of this invention.

Referring to FIG. 1, there is shown a display device employed in a signature identification system in accordance with a preferred embodiment of this invention. The display device includes a card reader 31 receiving an integrated-circuit (IC) card through a card inlet 31a to read data stored in a memory of the IC card, and a small computer having a display 32 and a controller 3 to receive data from card reader 31 for displaying on the display 32 a signature stored in the card received by the reader 31.

The display device of FIG. 1 is installed, e.g., in a cashier's machine in a store, wherein a signature shows up on the display 32 by inserting an IC card into reader 31 so as to be compared with the signature on a document or check presented to the cashier for identifying if the signature on the document is genuine.

Figure 2:
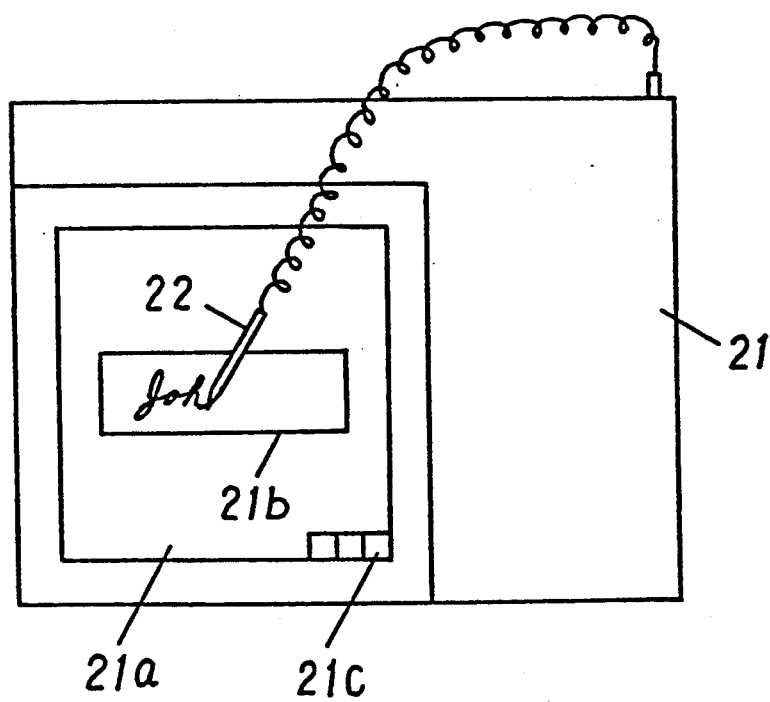
FIG. 2 is an external view showing a handwriting input device of a writing unit employed in the signature identification system.

In FIG. 2 there is shown a handwriting input device of a writing unit employed in the signature identification system of this embodiment. The reference numeral 21 represents a so called digitizer which converts an image signal into digital data and includes an operation panel 21a to read the hand-written signature signed thereon by a stylus pen 22. The handwriting input device is connected with a small computer (not shown in any drawings) so as to store the read handwritten signature into a memory of the small computer as a bit pattern. The area for reading such image data as the handwritten signature is restricted within a frame 21b in the center of the operation panel 21a so that the operator can sign within the frame 21b with the stylus pen 22. A switch 21c is disposed to be touched by the stylus pen 22 after a signature is written for entering the data representing the written signature into an IC card.

Figure 4:
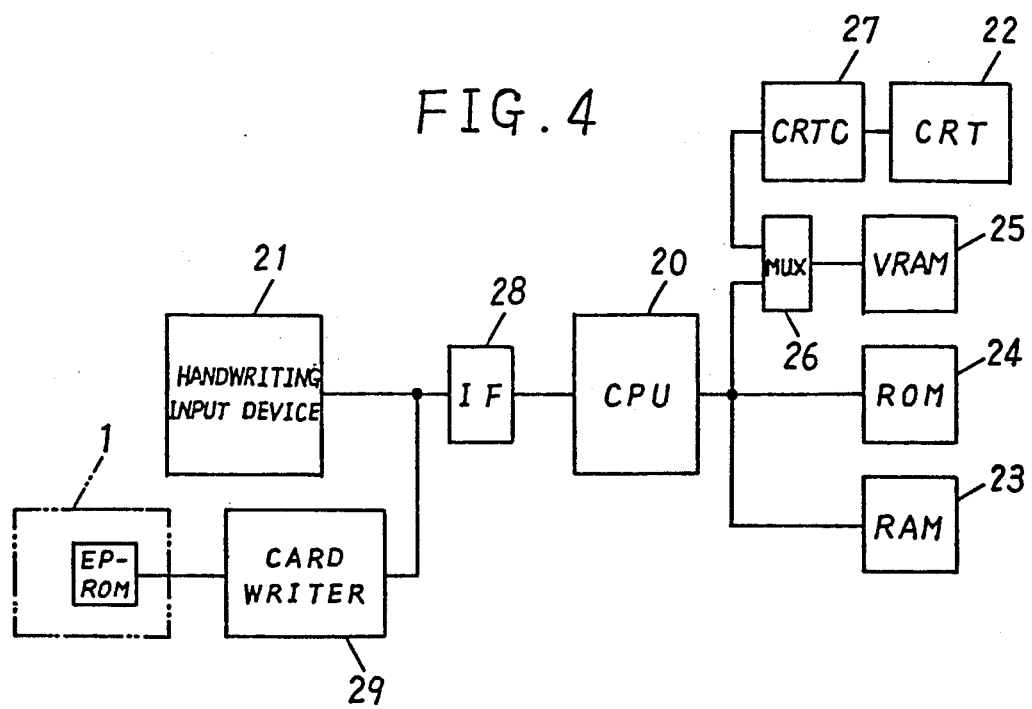
FIG. 4 shows a schematic block diagram of a controller section of the writing unit.

FIG. 4 shows a block diagram of a control section of the writing unit employing the handwriting input device 21 shown in FIG. 2. Exemplarily, the hand-writing input device 21 is designed to have a digitizer employing an electromagnetic induction method to produce matrix data or coordinate data through an RS232C type interface which are generated by the trace of the stylus pen. A CPU 20 employing a microprossor is disposed to control all operations for the writing unit. An operation program for CPU 20 is stored in ROM 24, and a RAM 23 works as an working area for executing the operation program. For example, the signature or sign data transmitted from the hand-writing input device 21 are stored in RAM 23. The sign data entered through the frame 21b are stored in RAM 23 in coordinate form of 64 dots on an ordinate and 256 dots in an abscissa. The sign data or image to be displayed on a CRT display 22 is stored in a display memory "VRAM" 25 on a bit image basis. The sign data stored in the memory 25 are converted into display signals through a display controller "CRTC" 27 to be displayed on the display 22. A multiplexer 26 is disposed to switch the display memory 25 to CPU 20 to be accessed thereby or to display controller 27 to be accessed thereby. A card writer 29 is employed as a writing means of the writing unit of this embodiment to write the sign data into the memory (EP-ROM)

within an IC card 1. The CPU 20 reads out the sign data from the RAM 23 for application to the card writer 29.

Figure 6:
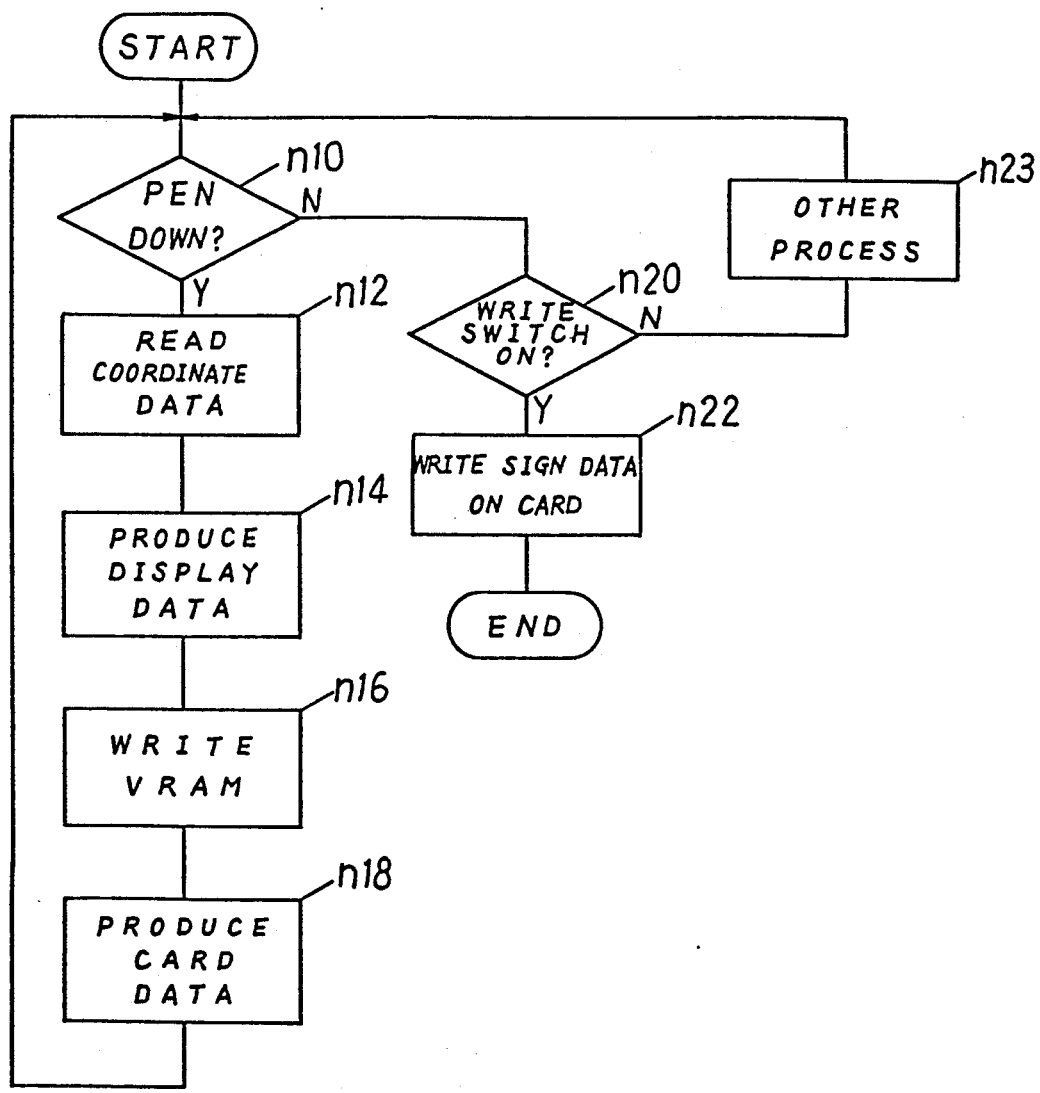
FIG. 6 is a flow chart illustrating the operation executed by a CPU employed in the writing unit.

FIG. 6 shows a flow chart illustrating the operations by the CPU 20. In step n10, the CPU 20 reads out the data developed from the handwriting input device 21 and inquires if the read out data include a pen down signal, i.e., if the stylus pen is pushed against the operational panel 21a. If the stylus pen is in a pen-down status, the coordinate data are read out, and display data corresponding to the read out data are produced to be written into the display memory 25 (n12→n14→n16). Moreover, the card data corresponding to the read out coordinates data are also produced to be written into RAM 23 (n18).

If the writing switch 21c of FIG. 2 is actuated after entering a handwriting signature by the stylus pen in step n18, the card data stored in RAM 23 are read out to be applied to card writer 29 (n20→n22). Unless the writing switch 21c is actuated in step n20, a predetermined operation, e.g., correction of the entered card data stored in RAM 23, is performed until the switch 21c is actuated. Thus, the sign data are written into the memory of the IC card.

Figure 3:
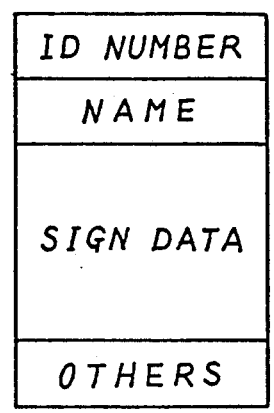
FIG. 3 shows a storage map within a memory in and IC card.

FIG. 3 illustrates a memory map within the memory of the IC card thus written. As shown in FIG. 3, the memory stores therein the ID number, name, sign data and other data. These data except the sign data are written into the card by a card issuing machine and accessed for a purpose other than signature identification.

Figure 5:
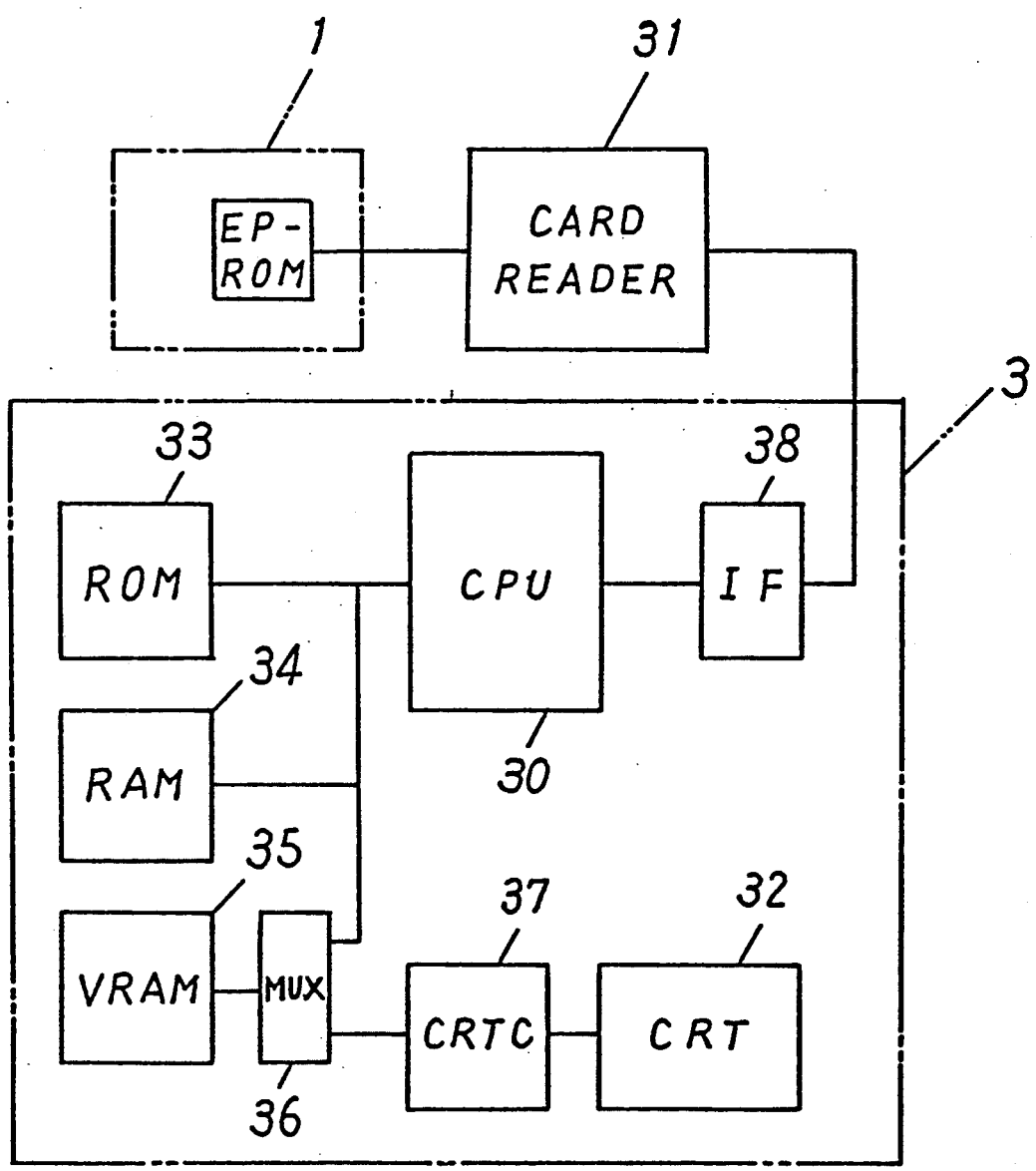
FIG. 5 shows a schematic block diagram of a controller section of the display device of FIG. 1.

FIG. 5 shows a block diagram of a control section in the display device of FIG. 1. A card reader 31 reads the sign data stored in the memory of IC card 1 to be applied to the controller 3 which is controlled by CPU 30 employing a microprocessor. The control program by CPU 30 is stored in ROM 33, and RAM 34 is used for a working area to execute the control program. The CPU 30 writes the data to be displayed into a display memory 35 as a bit image, and displays the bit image through a display controller 37. A multiplexer 36 is disposed to switch to a bus line with CPU 20 or to a bus line with the display controller 37.

FIG. 7A is a flow chart illustrating the operation for the card reader 31, and FIG. 7B is a flow chart for CPU 30. If an IC card is inserted into the card reader, the reader receives the card to read data stored in the memory of the card and generate the sign data in a predetermined data format (n32→n34→n36). Until all sign data are generated, the contents stored in the memory of the IC card are sequentially generated.

The sign data thus generated from the card reader are sequentially received by the controller 3 as illustrated in FIG. 7B. If the receiving by the controller is initiated, display data are produced according to the received data (n40→n42→n44). The produced display data are written into the display memory 35 to be sequentially displayed on the CRT display 32 (n46→n48→n42).

Thus, the signature information or sign data may be written into the memory of the IC card without bearing a visual signature by the writing unit, and in a credit card transaction the geniune signature can be displayed according to the sign data read from the IC card inserted into the IC card inlet. The clerk can easily compare the signature signed on a document with the displayed genuine signature.

Although in this embodiment the sign data are stored in the memory of the IC card as a bit image as they are, an input pattern of the handwriting signature may be stored and displayed as the combination of strokes having start and end points in a compressible manner. Moreover, the comparison between the signature on the document and the signature on the display device may be automatically performed by a kind of algorithm about its pattern or using a pattern recognition method. Although the sign data are stored in an IC card in this embodiment, they may be stored in any other memory card, such as a laser card, a high density magnetic card or the like.

Thus, according to this invention, the genuine signature cannot be viewed from the card without using a specified card reader, so that even if the card is stolen, dishonest use of the card can be avoided by precluding imitation of the genuine signature stored in the card. Moreover, since the genuine signature stored in the card is displayed on the display device on a large scale, it is easy to be compared for the purposes of signature identification.

It is to be understood by those skilled in the art that the foregoing description is a preferred embodiment of this invention and that various changes and modifications may be made in the invention without departing from the spirit and scope thereof.

What is claimed is:

1. A signature identification system for use with a user memory card adapted to electronically store invisible hand-written signature data representing a genuine signature of said user in a data storage area therein, said system comprising:
   a handwriting input device comprising:
   signature input means for inputting a hand-written signature;
   signature reading means for reading said hand-written signature inputted by a genuine user of said memory card; and
   writing means for writing said hand-written signature as hand-written signature data in said data storage area on said memory card, including:
      a controller to control operations of said writing means, said controller receiving said read hand-written signature from said signature reading means and converting it to hand-written signature data;
      a memory connected to said controller for storing said hand-written signature data;
      a display memory connected to said memory and controller for receiving said hand-written signature data;
      a display means for displaying said hand-written signature data; and,
      a display controller for converting said hand-written signature data stored in said display memory into a format for display on said display means;
   means for reading out said hand-written signature data in said data storage area of said memory card;
   said controller receiving said read out hand-written signature data for displaying it on said display means as a genuine hand-written signature; and
   said display means, responsive to said controller, for displaying said genuine hand-written signature so that said genuine hand-written signature displayed on said display means can be visually compared with another hand-written signature signed on another document to identify if said other hand-written signature is genuine.

2. The signature identification system of claim 1 further comprising means connected to said controller and to said display controller for switching said display memory to said controller and providing access by said controller to said display controller.

3. The signature identification system of claim 2, wherein data stored in said memory comprises, in coordinate form, a plurality of dots on an ordinate axis and a plurality of dots in an abscissa axis in order that said hand-written signature data forms an image to be displayed based upon said coordinate image.

* * * * *